United States Patent [19]

O'Neil et al.

[11] 4,025,032
[45] May 24, 1977

[54] ASSEMBLY DEVICE MOUNTING STICKS INTO FOOD

[75] Inventors: Fred O'Neil; Louise O'Neil, both of St. Paul, Minn.; Paul S. Ward, Costa Mesa, Calif.

[73] Assignee: Champion International Corporation, Stamford, Conn.

[22] Filed: Oct. 30, 1975

[21] Appl. No.: 627,210

[52] U.S. Cl. .............................. 227/141; 99/646 R; 426/421
[51] Int. Cl.² .......................................... A47J 43/00
[58] Field of Search ............... 99/485, 646 R, 533; 426/91, 134, 421; 53/7, 8; 227/141, 147

[56] References Cited

UNITED STATES PATENTS

| | | |
|---|---|---|
| 1,271,490 | 7/1918 | Servatius .............................. 99/533 |
| 2,173,850 | 9/1939 | Lockwood ..................... 426/421 X |
| 2,430,532 | 11/1947 | Rayburn ........................ 227/147 X |
| 2,666,201 | 1/1954 | Van Orden ....................... 227/147 |
| 3,013,272 | 12/1961 | Barratt ............................. 227/141 |
| 3,440,797 | 4/1969 | Spielmann ........................... 53/7 X |

*Primary Examiner*—Philip R. Coe
*Attorney, Agent, or Firm*—Evelyn M. Sommer

[57] ABSTRACT

A machine for inserting pliable handles into soft food articles, such as apples, pears, corn cobs, etc. Pliable, nonsplintering handles, made of coiled paper, are used to avoid accidents, especially when the food is eaten by a child. The handle is loaded into a spring holder, supported by a cylindrical jacket, and the food article is forced down on the handle against the force of the spring. The jacket supports the handle as it enters the food, preventing bending or buckling.

6 Claims, 4 Drawing Figures

ASSEMBLY DEVICE MOUNTING STICKS INTO FOOD

BACKGROUND OF INVENTION

Handles for ice cream, apples and other fruit, and corn cobs have been made of wood. Wooden handles have presented a problem of possible injury to children due to the rigidity and splintering qualities of the sticks used.

Safety handles made of coiled paper have been used successfully for this purpose since they do not splinter and, in case of a fall, they are pliable enought to bend rather than cause abrasions or cuts to any part of the user's body. Handles made of coiled paper have been described in U.S. Pat. No. 3,862,591 issued Jan. 28, 1975, assigned to the same assignee as this application.

Since the handles are made pliable for safety reasons, there is a problem of inserting the handles into certain types of food. Apples, pears, and the ends of corn cobs are generally soft enought to accept a handle made of paper but there is a chance of bending during insertion and, for the sake of uniformity, and to insure proper depth of insertion, an assembly device is used. The coiled paper handles are supported by a cylindrical jacket during the insertion operation so that bending or buckling cannot occur.

One of the features of the invention is the speed and convenience with which the handles can be inserted into the food.

Another feature of the invention is the ability of an operator to insert a handle into an apple or a corn cob using only one hand in the process.

Another feature of the invention is the uniformity of the finished product. The handle is inserted into the food a predetermined distance each time.

Additional details of the invention will be disclosed in the following description, taken in connection with the accompanying drawings.

DESCRIPTION OF THE PREFERRED EMBODIMENT

Figure 1:
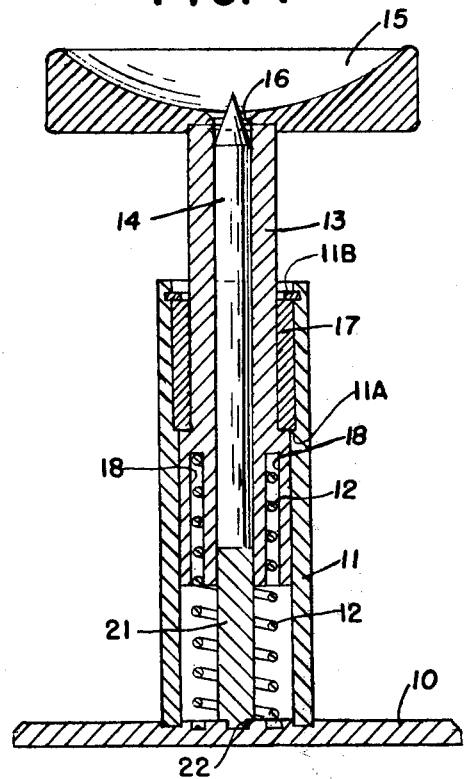
FIG. 1 is a cross sectional view of the device taken along line 1—1 of FIG. 3, showing all the parts.
Figure 2:
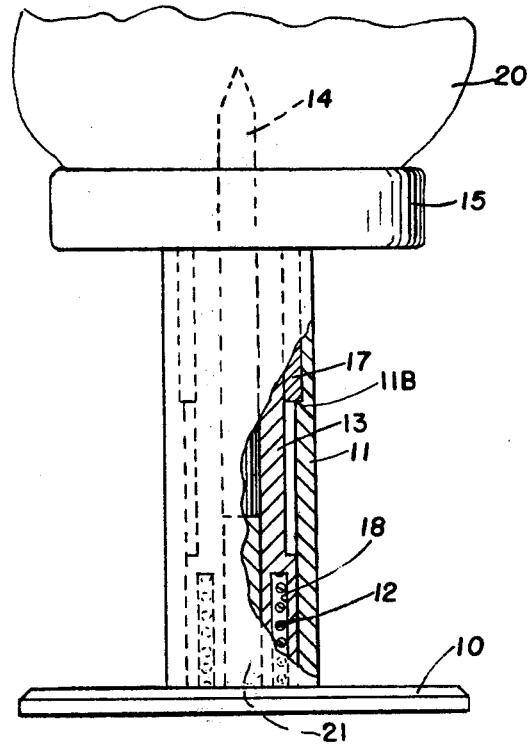
FIG. 2 is a side view of the assembly device, with an article of food placed on the receiving bowl and the bowl depressed for handle insertion.
Figure 3:
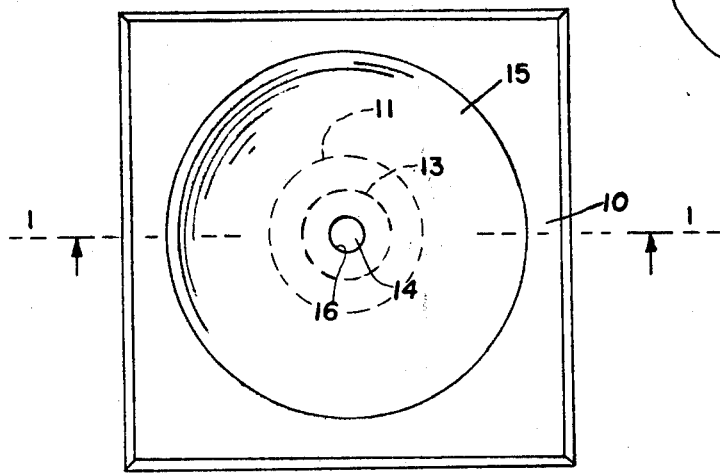
FIG. 3 is a top view of the assembly device shown in FIG. 1.

FIGS. 1, 2 and 3 show the details of the assembly device where a square flat base 10 supports the other components. Secured to the base 10 is a hollow cylindrical casing 11, supporting a helical spring 12, a movable cylindrical jacket 13, and a pliable paper handle 14, all positioned in axial alignment with the base 10. At the upper end on jacket 13, a receiving bowl 15 is secured for receiving the article to which the handle is to be attached. The bowl 15 is formed with an axial hole 16 through which the handle 14 is first entered and finally removed.

In order to retain the jacket 13 within the casing 11, a sleeve 17 is secured to the upper inside surface of the casing 11. The lower edge of sleeve 17 limits against a shallow ledge 11A cut in the outer casing 11. The upper edge of sleeve 17 is held by a spring retaining ring 11B, which is removable for easy disassembly of the parts when cleaning is necessary. The lower portion of jacket 13 is somewhat larger than the upper portion and slides up and down, bearing on the inside surface of the casing 11. The lower portion of jacket 13 is formed with an annular slot 18 for accomodating the spring 12. A short shaft 21 is axially mounted within the casing 11 for providing a support for the lower end of the handle 14 during the assembly operation. Shaft 21 is secured to the base 10 by means of a hole 22 forming a press-fit junction with the lower end of the shaft.

FIG. 1 shows the jacket 13 in its upper position with the lower portion of jacket 13 abutting the sleeve 17 and held in this position by the force of the helical spring 12. FIG. 2 shows the jacket 13 in its lower position, force down by manual pressure on an article of food 20. The helical spring 12 is depressed, entering the annular slot 18, and the bottom surface of jacket 13 limits against the top surface of the base 10.

FIGS. 1 nd 2 show the usual hatched lines indicating the components are made of metal. It is evident from the above description that the casing 11, jacket 13, and sleeve 17 can be made of plastic material such as high density polyethylene, a preferred material, since it is acceptable for contact with food but also has high impact strength and a natural lubricity which produces a smooth operating device. The retaining ring 11B is made of spring steel and the helical spring 12 is made of stainless steel.

The device is assembled by first securing the lower ends of the shaft 21 and the casing 11 in circular slots shown in FIG. 1. One convenient means of forming a bond is by the application of ultrasonic welding. Next, the jacket 13, with the helical spring 12 is lowered into the casing 11 and the sleeve 17 is pushed into place and locked by its retaining ring 11B. The device is finished by attaching the receiving bowl 15.

Figure 4:
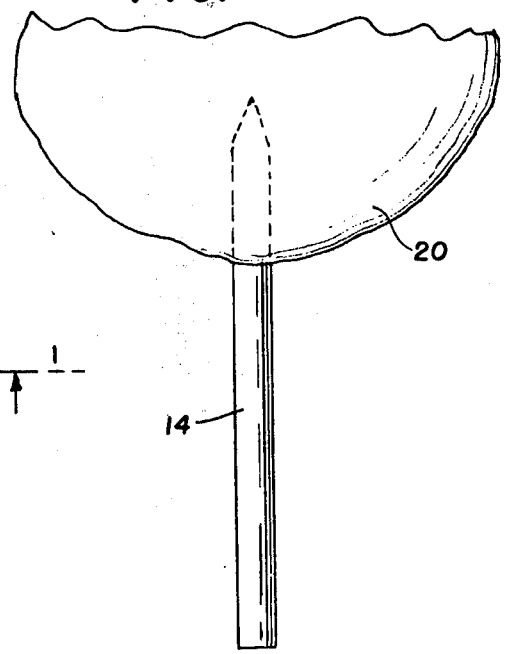
FIG. 4 is a side view of the fruit with its handle after being removed from the assembly device.

The operation of the assembly device is as follows: A handle stick 14 is dropped into the hollow portion of jacket 13 as shown in FIG. 1. Next, a piece of fruit 20 or a corn-on-the-cob is placed on the bowl 15 and the fruit or cob is manually depressed as indicated in FIG. 2. This action moves the pointed handle 14 into the fruit guided by the jacket 13 which prevents bending or buckling. Finally, the fruit 20 plus the handle are removed from the device resulting in an article as shown in FIG. 4. The operation is resumed by placing another handle in the device and proceeding as before. The result is a fast-operating means of dispensing a candied apple on a stick or a corn-on-the-cob with two handles.

The embodiments of the invention in which an exclusive property or privilege is claimed are defined as follows:

1. An assembly device for inserting an elongated pliable stick into an article of food comprising:
    an elongated hollow casing for limiting the movements of the assembly components, said casing having an upper end, a lower end, and a base portion on the lower end thereof,
    an elongated cylindrical jacket having an axial opening extending therethrough for releaseably supporting said pliable stick within said axial opening along the entire length of said stick, said jacket being sustantially the same length as said pliable stick and being axially movable within and concentric with said elongated hollow casing, said jacket having an upper portion extending exteriorly of the upper end of said casing, a cylindrical shaft axially disposed in said hollow casing and having an end secured to said base, said shaft having another end extending into the axial opening of the cylindrical jacket to engage and support one end of said pliable stick resilient spring means mounted within said hollow casing extending between said base and the movable jacket for urging said jacket to a position wherein said pliable stick is substantially enclosed within the axial opening in said jacket, limit means for preventing said cylindrical jacket from withdrawing from said casing, and a receptacle having a base and an upright sidewall defining an enclosure and support for a portion of an article of food, said receptacle mounted on the upper portion of said jacket exteriorly of said casing, said base of said receptacle having a second axial opening in communication with the axial opening in said cylindrical jacket to receive said stick within the interior of said receptacle prior to and during the insertion of said stick, whereby when a pliable stick is removably mounted within the axial openings in said jacket and receptacle and an article of food supported in said receptacle is pressed against the end of said pliable stick oppostie to said end which engages the cylindrical shaft and overcomes the urging force of said resilient spring means, said article of food, receptacle, and said cylindrical jacket are moved relative to said pliable stick to thereby force said pliable stick into said article of food.

2. An assembly device according to claim 1 wherein said limit means includes a sleeve secured to the inside surface of the hollow casing and an annular flange on the outside surface of said jacket; said sleeve and said flange having adjoining edges forming a limit stop which prevents the withdrawal of the jacket from the casing.

3. An assembly device according to claim 1 wherein said receptacle is a shallow bowl 4. An assembly device according to claim 1 wherein said resilient spring means is a helical spring having an end in contact with the base, and an opposite end coupled to the movable jacket.

5. An assembly device according to claim 4 wherein the helical spring is fitted into an annular axially slot formed in a lower portion of the elongated cylindrical jacket.

6. An assembly device according to claim 2 wherein said sleeve is secured to the casing by means of a spring retaining ring, a portion of which is positioned in an annular slot formed in the inside surface of the hollow casing.

* * * * *

UNITED STATES PATENT OFFICE
CERTIFICATE OF CORRECTION

Patent No. 4,025,032                    Dated May 24, 1977

Inventor(s) Fred O'Neil etal.

It is certified that error appears in the above-identified patent and that said Letters Patent are hereby corrected as shown below:

Column 3, line 29, "oppostie" should read -- opposite --.

Signed and Sealed this

Twelfth Day of December 1978

[SEAL]

Attest:

RUTH C. MASON
Attesting Officer

DONALD W. BANNER
Commissioner of Patents and Trademarks